United States Patent
Zimmerberg et al.

[11] Patent Number: 5,170,286
[45] Date of Patent: Dec. 8, 1992

[54] RAPID EXCHANGE IMAGING CHAMBER FOR STOP-FLOW MICROSCOPY

[75] Inventors: Joshua J. Zimmerberg, Bethesda; James V. Sullivan, Bowie; Peter M. Bungay, Bethesda, all of Md.

[73] Assignee: The United States of America as represented by the Secretary of the Department of Health and Human Services, Washington, D.C.

[21] Appl. No.: 656,326

[22] Filed: Feb. 19, 1991

[51] Int. Cl.$^5$ ............................................. G02B 21/34
[52] U.S. Cl. ..................................... 359/398; 356/246
[58] Field of Search ................ 350/536, 533; 356/246, 356/244; 269/235, 233, 236, 229; 359/398

[56] References Cited

U.S. PATENT DOCUMENTS

| | | | |
|---|---|---|---|
| 2,908,303 | 10/1959 | Schmidt | 269/235 |
| 2,942,520 | 6/1960 | Rose | |
| 3,515,491 | 6/1970 | Emary | 356/246 |
| 3,521,963 | 7/1970 | Bader | 356/246 |
| 3,552,865 | 1/1971 | Leung et al. | 356/246 |
| 3,726,597 | 4/1973 | Dvorak et al. | |
| 3,941,567 | 3/1976 | Combaz | 350/536 |
| 4,241,259 | 12/1980 | Feuerbaum et al. | |
| 4,278,887 | 7/1981 | Lipshutz et al. | |
| 4,338,024 | 7/1982 | Bolz et al. | |
| 4,580,901 | 4/1986 | Goldsmith | |
| 4,588,893 | 5/1986 | Vidrine et al. | 356/246 |
| 4,707,086 | 11/1987 | Dahan et al. | |
| 4,748,124 | 5/1988 | Vogler | |
| 4,804,267 | 2/1989 | Greenfield | |
| 4,974,952 | 12/1990 | Focht | 356/246 |

*Primary Examiner*—Jon W. Henry
*Attorney, Agent, or Firm*—Lowe, Price, LeBlanc & Becker

[57] ABSTRACT

A specimen chamber comprising a central chamber element sandwiched between a base plate and a cover plate, which base plate and cover plate secure cover slips within recessed areas on opposite surfaces of the central chamber portion which face the base and cover plate. The central chamber element includes a central flow passage, which terminates at opposite ends into tee channels. The sandwiched arrangement of the elements is secured by locking pins, which are insertable into alignment post elements that extend from the base plate though the central chamber element and the cover plate. The locking pins include a plurality of locking cams.

19 Claims, 4 Drawing Sheets

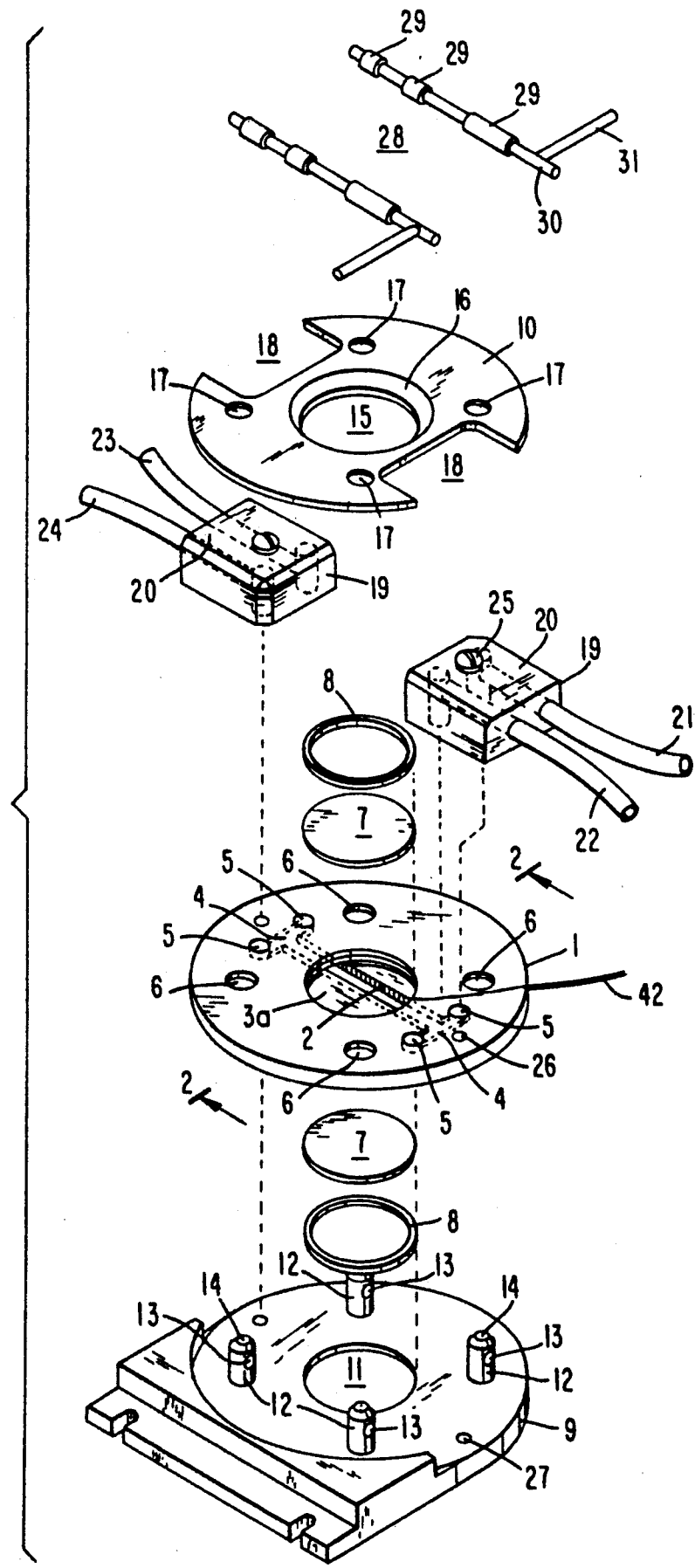

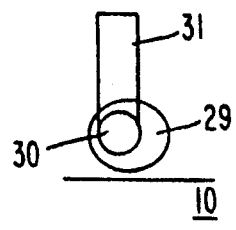
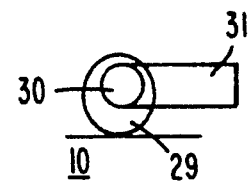
Fig. 3a             Fig. 3b
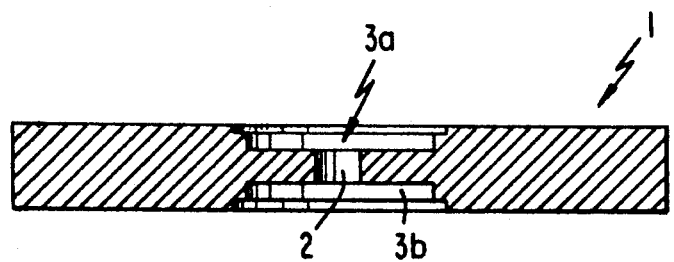
Fig. 2

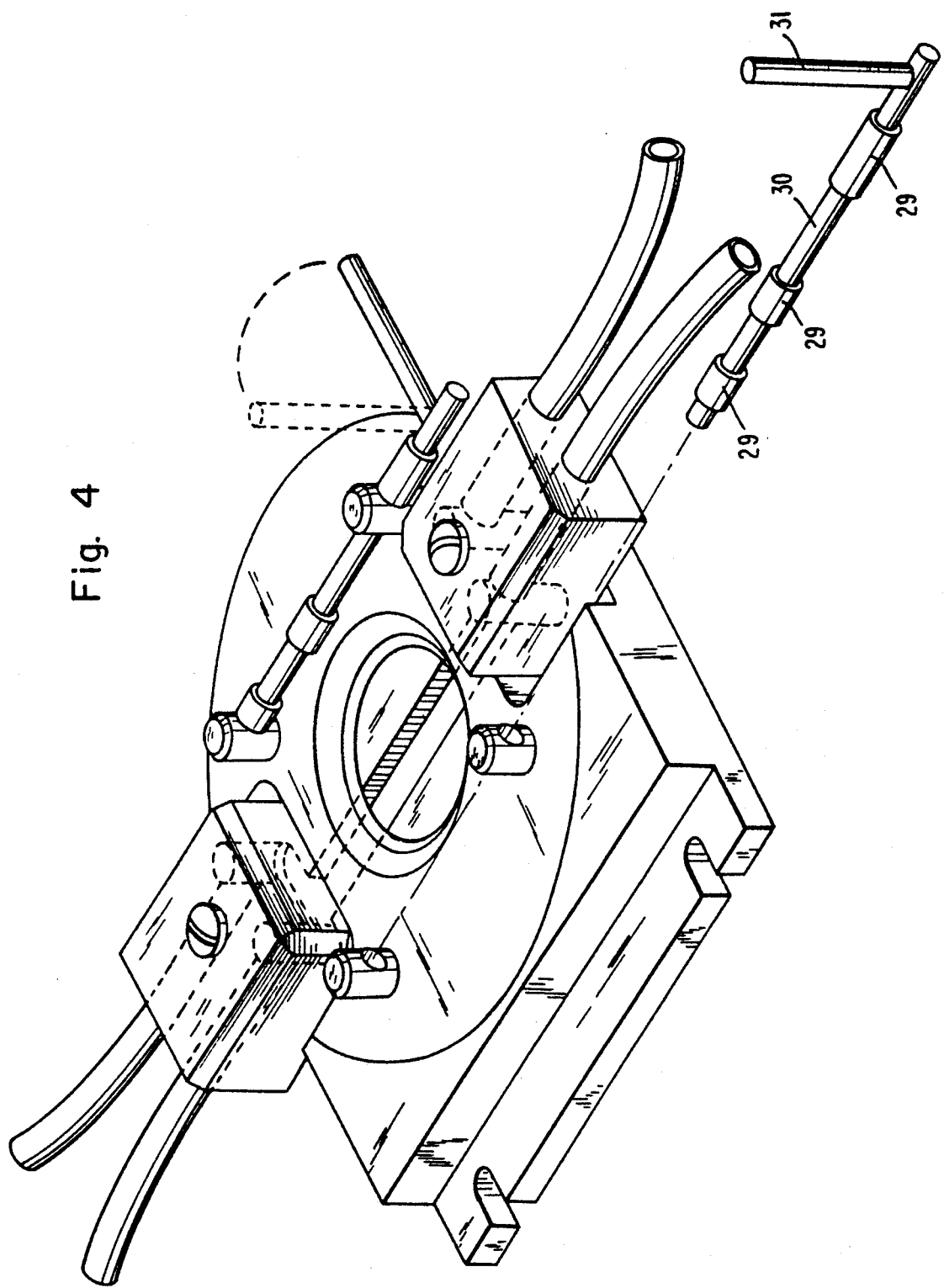

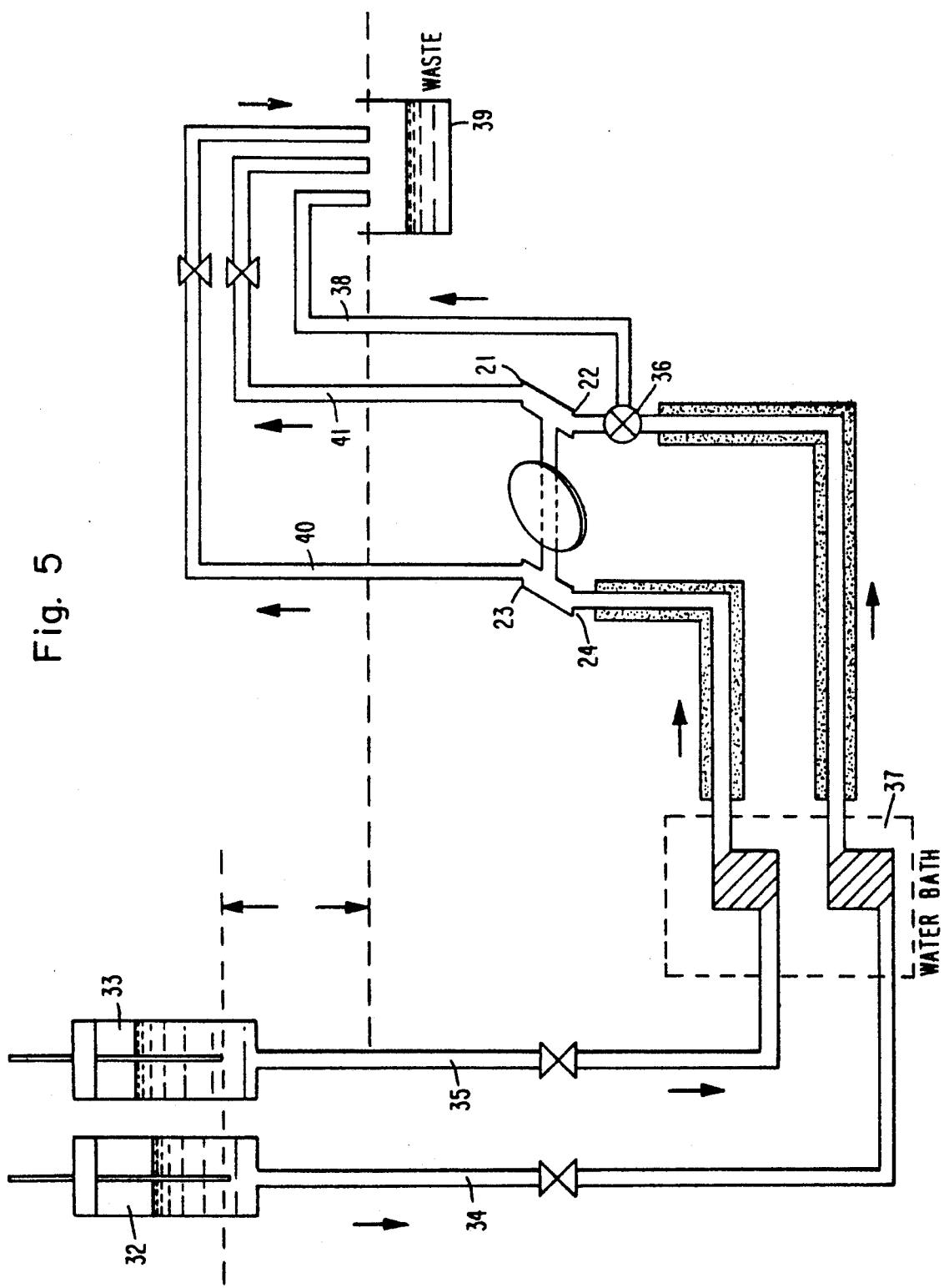

RAPID EXCHANGE IMAGING CHAMBER FOR STOP-FLOW MICROSCOPY

TECHNICAL FIELD

The present invention relates to optical sample chambers useful for optically observing or monitoring specimens or samples, including reaction mixtures therein. More particularly, the present invention relates to optical sample chambers which have optimal optical access to the specimens or samples contained therein.

BACKGROUND ART

A number of sealed chambers for viewing specimens microscopically or spectroscopically have been developed. Such chambers in which specimens and sample fluids may be introduced include fluid or sample inlet and outlet passages, and at least one optical site at which a specimen or sample in the chamber may be optically observed either by the naked eye or by any number of optical measuring instruments.

In contrast to optical cuvettes, which are merely walled containers having no fluid or sample flow means, dynamic sample or specimen chambers that include fluid or sample inlet and outlet passages generally comprise a chamber compartment defined between one or more covers, cover slips, or lenses, and O-retainers and O-rings. Pumps or syringes may be incorporated to direct flow into or from the chamber for either continuous or staged investigation.

U.S. Pat. No. 2,942,520 discloses a tissue culture device used with a microscope comprising retaining plates 12 and 14, a chamber 28 defined within gasket 20, and cover slips 16 and 18 over the chamber. The gasket forms a fluid-tight seal. Hypodermic needles can be inserted through the gasket into the chamber for additional removal of fluid.

U.S. Pat. No. 3,726,597 discloses a device having an O-ring 17 over steel plate 16 and cover glasses 15 and 16 which are sealed by snap-ring 18. A needle 20 extends through a spacer ring and the cover glasses. The syringe may be used to fill or evacuate the chamber. The rings can be connected to a pump to sustain a flow rate of 1 cc per hour.

U.S. Pat. No. 4,241,259 teaches a scanning electron microscope having a sample chamber 20 hermetically sealed. The chamber is connected to a vacuum pump 70.

U.S. Pat. No. 4,278,887 discloses a fluid sample cell for spectrographic analysis comprising an annular cover 14, a viewing aperture 18 and an O-ring 28 for mounting a diffuse mirror 22 and forming a fluid-tight seal, transparent window 36 and a sample chamber 38. A piping system pumps fluid through an inlet conduit and an outlet conduit.

U.S. Pat. No. 4,338,024 discloses a flow analyzer for blood cells, which includes a body 10 with passageway 16. A microscope is focused on examination area 18 and the passageway. Flow characteristics are controlled by adjusting the fluid pressure in containers 22 and 26.

U.S. Pat. No. 4,580,901 discloses a fluid sample cell for spectroscopic analyses, which can be placed horizontally or vertically. The cell comprises a fluid tight compartment 10. The sample can be heated through hot plate 90 and a thermostat can be used to control the temperature. The sample is introduced through an entry conduit 43 and exits through conduit 50 at a lower valve. On the passage to the sample chamber, the sample passes through a trough-shaped entry pocket 46, which extends longitudinally along the length of the channel 29. Clip 64 maintains a single cell in place.

U.S. Pat. No. 4,707,086 discloses a stage assembly for thermodynamic study under a microscope. The assembly includes a sealed outer envelope 1 having optical windows 6 and 7, and a sealed inner envelope having an experimental volume 9. The temperature, pressure, and the volume can be controlled and monitored.

U.S. Pat. No. 4,804,267 discloses a system for microscopic analysis of, fluids, which includes a flow cell 30 having a U-shaped body 32, and a central well 33. There is a central viewing chamber 34 at the bottom of the well. There are two retainers 36 and 37 made of glass or plastic, which enclose central element 38 with a cutout for display chamber 39 therebetween. Pump 40 conveys a sample from 14 through tubing 18 and through the sample cell 30 so that a portion enters the display chamber as a thin film of fluid.

U.S. Pat. No. 4,748,124 to Vogler, discloses a compartmentalized cell-culture device in which two sheets of gas-permeable, liquid-impermeable material sandwich a third sheet of material, which is selectively permeable to a class of molecules.

The present invention is an improvement over prior sample chamber devices.

DISCLOSURE OF THE INVENTION

It is accordingly one object of the present invention to provide for a specimen chamber having optimal optical access to a specimen within the chamber.

Another object of the present invention is to provide for a specimen chamber that provides for rapid fluid exchange with minimal mixing times.

Another object of the present invention is to provide for a specimen chamber that includes disposable cover slips as chamber walls which are easily exchangeable to facilitate maintenance of a clean optical path and cell and organelle attachment.

A further object of the present invention is to provide for a specimen chamber which minimizes lag times and unstirred-layer effects.

A still further object of the present invention is to provide for a specimen chamber having a variable chamber depth and no metal elements in the fluid path.

According to the present invention there is provided a specimen chamber including a central chamber element sandwiched between a base plate and a cover plate, which base plate and cover plate secure cover slips within recessed areas on opposite surfaces of the central chamber portion which face said base and cover plate. The central chamber element includes a central flow passage that terminates at opposite ends into tee channels.

The present invention further provides a specimen chamber comprising a central chamber element including a central flow passage sandwiched between a base plate and a cover plate, which base plate and cover plate secure cover slips within recess areas on opposite surfaces of said central chamber elements which face the base and cover plate. The sandwiched arrangement is secured by locking pins which are insertable into alignment post elements that extend though the central chamber element and the cover plate.

BRIEF DESCRIPTION OF DRAWINGS

The present invention will be described with reference to the annexed drawings, which are given by way of non-limiting examples only in which:

FIG. 1 is an exploded perspective view of a specimen chamber according to the present invention.

FIG. 2 is a cross-sectional view of the central chamber element of FIG. 1 taken along section line 2—2.

FIGS. 3a and 3b are cross-sectional views of the locking levers of FIG. 1 viewed along one end thereof. FIG. 3a illustrates a locking lever in an unlocked position. FIG. 3b illustrates a locking lever in a locked position.

FIG. 4 is a perspective view of the assembled specimen chamber illustrated in FIG. 1.

FIG. 5 is a diagram illustrating a fluid transfer arrangement for use in conjunction with the specimen chamber according to one embodiment of the present invention.

BEST MODE FOR CARRYING OUT THE INVENTION

The specimen chamber of the present invention is constructed of two metal plates that sandwich a central chamber element therebetween. A rectangular channel within the central chamber element provides a fluid path. In the center of the central chamber element, grooves allow placement of two cover slips on opposite surfaces thereof. The fluid path opens up at the grooved center of the central chamber element to allow the fluid to contact both cover slips.

Gaskets connect the cover slips to the metal plates, which fasten to compress the gaskets and eliminate leaks. At each end of the chamber the fluid path forms a tee and connects to two large bore outlets. These outlets can in turn be connected by large bore tubing to various valves to effect flow control. The temperature within the specimen chamber may be controlled with the aid of a thermocouple placed within the flow path. Small tubes can extend into the flow path to introduce drugs or proteins.

A particularly unique feature of the present invention involves the manner in which the elements of the specimen chamber are held together by locking pins, which may be quickly locked and unlocked to assemble and dissemble the specimen chamber for cleaning purposes or to insert or replace a specimen therein. The locking pins are insertable into alignment post elements, which extend from the base plate through each of the central chamber element and the cover plate. Locking cams on the locking pins exert pressure on the cover plate toward the base plate when the locking pins are pivoted.

FIG. 1 is an exploded perspective view illustrating the several elements that comprise the specimen chamber of the present invention. As illustrated in FIG. 1, the specimen chamber of the present invention includes a central chamber element 1, which may be made from a plastic, resinous material, ceramic material, or an inert metal or metal alloy. The choice of material from which to manufacture the central chamber element is dependent on the type of specimen or sample or reaction mixture to be observed in the device. In this regard, the material of construction should be chosen so as not to affect or contribute to the specimen or optical properies thereof which are to be observed, monitored or measured. In a preferred embodiment the central chamber element was made of lucite, which was determined to be suitable for investigating biological specimen samples.

The central chamber element is machined or molded or otherwise manufactured to have a central flow passage 2 formed between opposed recessed areas 3a and 3b, which are centrally located in opposed surfaces of the central chamber element (FIG. 2). As illustrated in FIG. 1, the central flow passage extends across the central chamber element in opposed directions from the center thereof and terminates at either end in a short tee channel 4. As further illustrated, each end of the tee channels terminates at a fluid passage bore 5, which extends through the upper surface of the central chamber element.

The central chamber element includes a plurality of alignment through-bores 6, which are spatially aligned to receive alignment posts 12 of base plate 9, as described in further detail below.

A pair of removable cover slips 7 are provided to be seated in opposed recessed areas 3a and 3b of the central chamber element. The cover slips are made of a material such as glass or plastic or resinous material, which allows optical observation of monitorable properties of a specimen or sample in the specimen chamber such as image, emitted energy, fluorescence, etc. As illustrated, in order to fit into the recess areas 3a and 3b, the cover slips have substantially the same shape as the recessed areas. For purposes of illustration only, the recessed areas and further corresponding elements to be described, including the cover slips, are shown as being circular in shape. However, it is to be understood that these elements could likewise be square, rectangular, polygonal, or have any desired shape.

A pair of gasket elements 8, e.g., O-rings, are provided to fluidly seal cover slips 7 in the recess areas 3a and 3b when the elements of the specimen chamber are assembled. As illustrated in FIG. 2, the recessed areas may be provided with seats for the gasket elements.

The cover slips 7 and gaskets elements 8 are held in position by means of a base plate 9 and a cover plate 10. Base plate 9 may be made from any suitably strong material, including plastics, and preferably metals, including stainless steel and aluminum. Since base plate 9 does not come into contact with the specimen or sample, contamination thereof by the material from which the base plate is made is of little concern. However, as will become apparent from the following description, the base plate and elements thereof function in conjunction with the cover plate 10 to secure the specimen chamber assembly and therefore are required to be made of a suitably strong material.

Base plate 9 includes a central opening 11 and a plurality of alignment post elements 12, which are preferably integral with and extend outwardly from a substantially flat surface of the base plate. The central opening 11 is appropriately sized to apply a sealing pressure to the lower gasket element 8 when the elements of the specimen chamber are assembled. In this regard, as obvious from FIG. 1, the central opening 11 is necessarily slightly smaller than the periphery of the lower gasket element 8.

Each of the alignment post elements 12 of the base plate 9 includes a through-bore 13 having an axis that is parallel to the flat surface of the base plate from which the alignment post elements extend. As will be appreciated upon understanding how the specimen chamber is assembled, the alignment post members 12 are provided with partially bevelled terminal ends 14 in order to make the alignment and assembly of the elements of the specimen chamber easy.

The cover plate 10 is made from a material similar to that of the base plate 9. Likewise, similar to the base plate 9, the cover plate 10 includes a central opening 15, which is slightly smaller than the periphery of upper gasket element 8 to provide a sealing pressure on the gasket element when the elements of the specimen chamber are assembled.

The cover plate 10 includes a plurality of alignment through-bores 17, which are spatially aligned with the alignment posts elements 12 of base plate 9. The through-bores 17 of cover plate 10 are likewise spatially aligned with the alignment through-bores 6 of the central chamber element 1. As illustrated, the central opening 15 of the cover plate 10 may have a bevelled edge 16 in order to improve access to the under lying cover slip 7 when the elements of the specimen chamber are assembled.

The cover plate 10 includes cutout portions 18 located in opposed positions from each other. The cutout portions 18 are provided in the cover plate 10 to allow access to portions of the central chamber element 1 for attaching thereto fluid passage coupling members 19, which include connector blocks 20 and fluid passage lines 21-24. The fluid passage coupling members are attachable to base plate 9 by means of threaded screws or similar fastening means 25, which, when assembled, pass through small through-bores 26 in the central chamber element to be secured in internally threaded bores 27 in the base plate 9. When the fluid passage coupling means are attached to the central chamber element, the fluid passage lines are coupled to fluid passage bores 5. By utilizing relatively large diameter fluid passage lines, rapid fluid exchange and minimum mixing times may be obtained. In this regard, it is noted that due to the tee channels, each end of the central flow passage has two fluid ports, i.e., fluid passage bores 5.

The specimen chamber of the present invention includes a pair of locking levers 28, which comprise locking cam elements 29 arranged along a substantially straight rod or pin members 30. A pivoting lever 31 is provided at one end of rod or pin members 30 for use in turning the locking levers between a locked and unlocked position as described in detail herebelow. The locking cam elements 29 are offset from the central axis of the rod or pin members 30 as shown in FIGS. 3a and 3b, which illustrate the locking levers in both an unlocked and a locked position, respectively.

To assemble the elements of the specimen chamber described above, the cover slips 7 and gasket elements 8 are first positioned in the recessed areas 3a and 3b of the central chamber element 1. With the cover slips and gasket elements in place, the alignment through-bores of the central chamber element are aligned with the alignment post elements 12 of the base plate 9 and the central chamber element 1 is positioned to rest on the surface of the base plate. Next, the alignment through-bores 17 of the cover plate 10 are aligned with the alignment post elements of the base plate and the cover plate 10 is positioned to rest on the upper surface of the central chamber element 1.

To secure the base plate 9, central chamber element 1 and cover plate 10, the rod or pin portion of the locking levers 28 are inserted into the through-bores 13 of the alignment post elements 12. With the rod or pin portion of the locking levers fully inserted in the through-bores of the alignment post elements (see FIG. 4), the pivoting levers 31 are manipulated as illustrated in FIGS. 3a and 3b to position the locking levers into a locked position in which the locking cam elements press down upon the upper surface of the cover plate to secure the assembled elements.

After the cover plate is secured, the fluid passage coupling means may be attached to the assembly by means of the attachment means described above. The assembled specimen chamber is illustrated in FIG. 4, which shows the manner in which the locking levers are utilized. As is apparent from FIG. 4, the fluid passage coupling means may be attached before or after the locking levers are operated to secure the cover plate.

FIG. 5 illustrates a fluid transfer arrangement utilized in conjunction with the specimen chamber according to one embodiment of the present invention.

As illustrated in FIG. 5, fluids, e.g., reactants, from reservoirs 32 and 33 are fed through fluid passage lines 34 and 35 to a three-way valve 36 and to one of the above-described fluid passage lines (24) of the specimen chamber, respectively. Fluid passage lines 34 and 35 are illustrated as passing through a water bath 37 (or equivalent heating means) located upstream of the specimen chamber.

The three-way valve 36 selectively connects fluid passage line 34 to one of the above-described fluid passage lines (22) and connects this fluid passage line (22) to a waste reservoir 39. Fluid passage lines 40 and 41 respectfully connect each of the above-described fluid passage lines (23 and 21) to the waste reservoir.

In operation, a specimen such as biological cells is placed in the specimen chamber and a reaction medium, e.g., nutrient medium, is fed to the specimen chamber from reservoir 32 via fluid passage line 34 to contact the specimen in the specimen chamber. In order to flush or remove the reaction medium from the specimen chamber, valve 36 is turned to connect the flow passage line 22 to line 38 (thus closing line 34) and fluid from reservoir 33 is fed through fluid passage line 35 to the specimen chamber and out from the specimen chamber through each of fluid passage lines 38, 40 and 41.

As should be appreciated, any number of reactant fluid reservoirs many be utilized in conjunction with a multiport valve means or a bank of appropriately connected valves. Moreover, the specimen chamber is not limited to examination of biological specimens, but may be utilized for monitoring or detecting any reaction that undergoes visually observable change, including color, radiation emittance, e.g., fluorescence, imageable change, e.g., clouding or precipitation, etc.

In a preferred embodiment of the present invention, illustrated in FIG. 1, a thermocouple 42 is provided in contact with the central flow passage for monitoring the temperature of the specimen. In further embodiments for other analysis methods, various sensors including thermocouples, electrode leads, etc., may be incorporated in communication with the central flow passage to monitor or detect changes in temperature, conductivity, etc.

In addition to the above-discussed embodiments, in a further embodiment, the depth of the specimen chamber may be varied by incorporating spacers between the cover plates and the central chamber element to accommodate variation in the overall thickness of the central chamber element.

Although the present invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims that follow.

We claim:

1. A specimen chamber comprising a central chamber element sandwiched between a base plate and a cover plate, which base plate and cover plate secure cover slips within recessed areas on opposite surfaces of said central chamber portion which face said base and cover plate, said central chamber element including a central flow passage consisting of a substantially linear channel having opposite terminal ends which 2. A specimen chamber according to claim 1, wherein said central flow passage is in fluid communication with each of said cover slips.

3. A specimen chamber according to claim 1, wherein each tee channel has opposed ends which terminate into a fluid passage bore, which extends through the surface of the central chamber element which faces the cover plate.

4. A specimen chamber according to claim 3, further including fluid passage coupling means, which comprise fluid passage lines connectable to said fluid passage bores.

5. A specimen chamber according to claim 1, wherein said base plate includes a plurality of alignment post elements and each of said central chamber element and cover plate includes a plurality of alignment through-bores for receiving said alignment post elements.

6. A specimen chamber according to claim 5, further comprising through-bores in each of said alignment post elements and locking pins, which are receivable in said through-bores of said alignment post elements to secure said sandwiched arrangement of said base plate, central chamber element, and cover plate.

7. A specimen chamber according to claim 6, wherein each of said locking pins is sufficiently long to pass through at least two of said through-bores of said alignment post elements.

8. A specimen chamber according to claim 7, wherein said locking pins include locking cam means which are adapted to press said cover plate toward said base plate.

9. A specimen chamber according to claim 1, further including a thermocouple in said central flow passage.

10. A specimen chamber according to claim 1, further including gasket elements between each of said cover slips and said central chamber element.

11. A specimen chamber according to claim 1, wherein said central chamber member is made from a plastic material.

12. A specimen chamber comprising a central chamber element including a central flow passage sandwiched between a base plate and a cover plate, which base plate and cover plate secure cover slips within recessed areas on opposite surfaces of said central chamber portion which face said base and cover plate, said sandwiched arrangement being secured by locking pins which are insertable into alignment post elements which extend though said central chamber element and said cover plate, each of said locking pins being sufficiently long so as to be insertable into at least two of said alignment post elements.

13. A specimen chamber according to claim 12, wherein said alignment post elements extend from said base plate.

14. A specimen chamber according to claim 12, wherein said locking pins include locking cam means which are adapted to press said cover plate toward said base plate.

15. A specimen chamber according to claim 14, wherein said locking pins include at least two cam elements.

16. A specimen chamber according to claim 15, wherein said locking pins include three cam elements.

17. A specimen chamber according to claim 12, wherein said locking pins include pivoting levers to rotate said locking pins.

18. A specimen chamber according to claim 12, further including fluid passage coupling means connectable to said base plate through said central chamber element and include fluid passage lines connectable with said central flow passage.

19. A specimen chamber according to claim 12, wherein said central chamber member is made from a plastic material.

* * * * *